Patented Nov. 16, 1937

2,099,236

UNITED STATES PATENT OFFICE 2,099,236

COATING COMPOSITION AND PROCESS OF PREPARING SAME

Robert L. Sibley, Nitro, W. Va., assignor, by mesne assignments, to Monsanto Chemical Company, Wilmington, Del., a corporation of Delaware No Drawing. Application February 15, 1932, Serial No. 593,198

20 Claims. (Cl. 134—56)

The present invention relates to improvements in coating compositions and to the process of preparing same. More particularly, the present invention relates to coating compositions containing a drying oil and includes as its object the provision of a composition possessing the characteristic property of interrupting or retarding the continued oxidation of oils, paints, varnishes and the like after the said products have reached the desired oxidized condition.

In the manufacture of paints and varnishes including the incorporation of drying oils therein it is usually customary to employ a suitable quantity of an oxidation catalyst to speed up the normal drying rate of the oil so that the composition will dry hard within a reasonable time when it is spread in a thin film over a surface. This positive oxidation catalyst is commonly called a dryer. It is known that the dryers commonly employed induce various oxidation phenomena, some of which are necessary and desirable and some of which are very objectionable from the practical operation standpoint. According to the present invention, the undesirable qualities of the so-called dryers are substantially eliminated by the incorporation in paints, varnishes, oils and the like of a small proportion of a preferred class of oxidation inhibitors comprising ketone-amine reaction products and preferably comprising ketone aromatic amine reaction products and derivatives thereof.

As one method of operating the present invention a varnish was prepared by heating seven pounds of tung oil and two pounds of modified phenolic resin to 450° F. for sixty minutes, after which the resulting product was cooled to 420° F. and thinned with one and one-third gallons of mineral spirits. Substantially 20 grams of a lead-cobalt naphthenate dryer was added thereto. The material thus obtained was a very rapid drying varnish which contained substantially 56% of non-volatile matter.

To 100-gram portions of the finished varnish prepared in the manner described, 0.173 gram of a ketone-amine reaction product and preferably a ketone aromatic amine reaction product or a derivative thereof was added in a convenient manner and the treated varnish tested in a manner hereinafter described. As specific examples of the operation of the present invention the condensation product of substantially equi-molecular proportions of diacetone alcohol and aniline, the reaction product of substantially equi-molecular proportions of methyl ethyl ketone and aniline, the reaction product of substantially equi-molecular proportions of acetone and alpha-naphthylamine and the reaction product of substantially equi-molecular proportions of acetophenone and alpha naphthylamine were each incorporated in 100 gram portions of the above prepared varnish. The products thus prepared were incorporated on clean black iron panels in a convenient manner, as for example by flowing thereon. Samples of the untreated varnish were also incorporated in the same manner on identical iron panels for purposes of comparison. The panels prepared in the manner described were exposed to the sun's rays in the open atmosphere and sprayed daily with water. Frequent examinations were made. At the end of nine weeks a marked improvement was found in the durability of the varnishes wherein the preferred materials were incorporated against weathering, oxidation and the like over that in which no oxidation inhibitor was incorporated.

It is thus shown from the above tests that the invention herein set forth comprises an important advance in the art of varnish, oil and paint manufacture.

Other ketone amines than those hereinbefore set forth which are equivalent in nature and general characteristics to those specifically described and which are adaptable to use in the manner described to produce surface coating compositions of the paint and varnish type comprise such products as are produced when acetone, methyl ethyl ketone, acetophenone, and diacetone alcohol are reacted with beta naphthylamine, ortho, meta and para toluidine, benzidene, xylidine, tolidine, 2,4 diamino diphenylamine, p,p diamino diphenyl methane, amino anthracene, diphenylamine, diphenyl guanidine, di ortho tolyl guanidine and the like. Furthermore, as substitutes for the ketones described above, mesityl oxide, phorone, cyclohexanone, diethyl ketone, benzophenone, aldol acetone, allyl-acetone, benzal acetone, acetyl acetone, diacetyl, acetonyl acetone, salicyl aldehyde acetone, furfural-acetone and the like may be reacted with the amines hereinbefore set forth and employed as oxidation inhibitors for incorporation in varnish, oils and paints.

It is obvious that the process and compositions described herein may be varied widely in their details without departing from the spirit or scope of the present invention. These possible variations will be apparent to those skilled in the art and the present invention is not limited to the specific details mentioned, except as described in the appended claims.

What is claimed is:

1. A coating composition containing a drying oil having incorporated therein a positive oxidation catalyst and a controller of oxidation thereof comprising a reaction product of a ketone and an amine or a derivative thereof.

2. A coating composition containing a drying oil having incorporated therein a positive oxidation catalyst and a controller of oxidation thereof comprising a reaction product of a ketone and an aromatic amine or derivative thereof.

3. A coating composition containing a drying oil having incorporated therein a positive oxidation catalyst and a controller of oxidation thereof comprising a reaction product of an aliphatic ketone and an aromatic amine or derivative thereof.

4. A coating composition containing a drying oil having incorporated therein a positive oxidation catalyst and a controller of oxidation thereof comprising a reaction product of an aliphatic ketone and an aromatic primary amine.

5. A coating composition containing a drying oil having incorporated therein a positive oxidation catalyst and a controller of oxidation thereof comprising a reaction product of an aliphatic group containing ketone and an aromatic primary amine.

6. A coating composition containing a drying oil having incorporated therein a positive oxidation catalyst and a controller of oxidation thereof comprising a reaction product of an acetone and an aromatic primary amine.

7. A coating composition containing a drying oil having incorporated therein an inhibtor of oxidation thereof comprising a reaction product of diacetone alcohol and aniline.

8. The improvement in the manufacture of coating compositions which comprises mixing the composition containing a drying oil with a positive oxidation catalyst and a controller of oxidation thereof comprising a reaction product of a ketone and an amine or a derivative thereof.

9. The improvement in the manufacture of coating compositions which comprises mixing the composition containing a drying oil with a positive oxidation catalyst and a controller of oxidation thereof comprising a reaction product of a ketone and an aromatic amine or a derivative thereof.

10. The improvement in the manufacture of coating compositions which comprises mixing the composition containing a drying oil with a positive oxidation catalyst and a controller of oxidation thereof comprising a reaction product of an aliphatic ketone and an aromatic amine or a derivative thereof.

11. The improvement in the manufacture of coating compositions which comprises mixing the composition containing a drying oil with a positive oxidation catalyst and a controller of oxidation thereof comprising a reaction product of an aliphatic ketone and an aromatic primary amine.

12. The improvement in the manufacture of coating compositions which comprises mixing the composition containing a drying oil with a positive oxidation catalyst and a controller of oxidation thereof comprising a reaction product of an aliphatic group containing ketone and an aromatic primary amine.

13. The improvement in the manufacture of coating compositions which comprises mixing the composition containing a drying oil with a positive oxidation catalyst and a controller of oxidation thereof comprising a reaction product of an acetone and an aromatic primary amine.

14. The improvement in the manufacture of coating compositions which comprises mixing the composition containing a drying oil with an inhibitor of oxidation thereof comprising a reaction product of diacetone alcohol and aniline.

15. A coating composition containing a drying oil having incorporated therein an inhibitor of oxidation thereof comprising a reaction product of an aliphatic ketone and an aromatic primary amine free from secondary amino substituents.

16. The improvement in the manufacture of coating compositions which comprises mixing the composition containing a drying oil with an inhibitor of oxidation thereof comprising a reaction product of an aliphatic ketone and aromatic primary amine free from secondary amino substituents.

17. A coating composition containing a drying oil having incorporated therein a positive oxidation catalyst and a controller of oxidation thereof comprising a reaction product of diacetone alcohol and aniline.

18. The improvement in the manufacture of coating compositions which comprises mixing the composition containing a drying oil with a positive oxidation catalyst and a controller of oxidation thereof comprising a reaction product of diacetone alcohol and aniline.

19. A coating composition containing a drying oil having incorporated therein a positive oxidation catalyst and a controller of oxidation thereof comprising a reaction product of an aliphatic ketone and an aromatic primary amine free from secondary amino substituents.

20. The improvement in the manufacture of coating compositions which comprises mixing the composition containing a drying oil with a positive oxidation catalyst and a controller of oxidation thereof comprising a reaction product of an aliphatic ketone and an aromatic primary amine free from secondary amino substituents.

ROBERT L. SIBLEY.